(12) United States Patent
Sato

(10) Patent No.: US 6,176,446 B1
(45) Date of Patent: Jan. 23, 2001

(54) SPINNING REEL HAVING A WATER-PROOF STRUCTURE

(75) Inventor: Jun Sato, Sakai (JP)

(73) Assignee: Shimano Inc., Sakai (JP)

( * ) Notice: Under 35 U.S.C. 154(b), the term of this patent shall be extended for 0 days.

(21) Appl. No.: 09/393,162

(22) Filed: Sep. 10, 1999

(30) Foreign Application Priority Data

Sep. 17, 1998 (JP) .................................................. 10-263185

(51) Int. Cl.[7] .................................................. A01K 89/00
(52) U.S. Cl. .......................... 242/319; 242/282; 242/321; 74/545
(58) Field of Search .................................. 242/319, 322, 242/311, 247, 246, 278, 279, 282, 321; 74/545

(56) References Cited

U.S. PATENT DOCUMENTS

| 2,745,607 | * | 5/1956 | Taggart et al. | 242/282 |
|---|---|---|---|---|
| 2,884,211 | * | 4/1959 | Holahan, Jr. | 242/319 |
| 4,742,974 | | 5/1988 | Furomoto . | |
| 4,911,378 | * | 3/1990 | Hitomi | 242/246 |
| 5,064,138 | * | 11/1991 | Sato | 242/319 |
| 5,149,008 | * | 9/1992 | Oi | 242/319 |
| 5,156,351 | | 10/1992 | Cittadini . | |
| 5,219,131 | * | 6/1993 | Furomoto | 242/246 |
| 5,415,358 | * | 5/1995 | Yamaguchi | 242/311 |
| 5,415,359 | * | 5/1995 | Ikuta | 242/319 |
| 5,443,571 | * | 8/1995 | Kang | 242/311 |
| 5,503,344 | | 4/1996 | Yamaguchi . | |
| 5,690,289 | * | 11/1997 | Takeuchi et al. | 242/282 |
| 5,988,547 | * | 11/1999 | Koelewyn | 242/246 |
| 5,996,918 | * | 12/1999 | Nanbu | 242/319 |
| 6,053,445 | * | 4/2000 | Farris | 242/319 |

FOREIGN PATENT DOCUMENTS

| 0 860 122 | 8/1998 | (EP) . |
|---|---|---|
| 2 158 331 | 11/1985 | (GB) . |

* cited by examiner

*Primary Examiner*—Donald P. Walsh
*Assistant Examiner*—Emmanuel M. Marcelo
(74) *Attorney, Agent, or Firm*—Shinjyu Intellectual Property Firm

(57) ABSTRACT

Configuration for waterproofing rotary mechanism shafts protruding from the compartments in which they are housed in a spinning reel main unit. In each case the shafts are supported on ball bearings, but in some cases the outer race and its mounting are fitted to be stationary in the compartment with respect to the compartment, and the shaft and the inner race supporting are rotatable. In other cases, the shaft and the inner race supporting it are stationary, and the outer race and its mounting in the compartment rotate about the shaft. Shaft seals are furnished to seal respective protruding shafts. In all cases, the seal is retained by the compartment mounting axially outward with respect to the compartment and contacts both the stationary and at least either the rotary component or the rotary mechanism shaft. Washers, caps, or lids retain and position the shaft seals against the shaft bearing stationary components.

15 Claims, 7 Drawing Sheets

SPINNING REEL HAVING A WATER-PROOF STRUCTURE

BACKGROUND OF THE INVENTION

A. Field of the Invention

The present invention relates to a water-proof structure, more specifically the present invention relates to a spinning reel having a water-proof structure that prevents liquid from entering a reel main body of the spinning reel.

B. Description of the Background Art

A spinning reel generally includes a reel main body having a complex combination of mechanisms disposed therein. A rotor is disposed at a front portion of the reel main body and is rotatably supported by the reel main body. A spool is supported on the reel main body, with portions of the rotor extending radially outwardly from the spool such that a fishline may be wound by movement of the rotor around a fishline receiving portion of the spool. The spool is disposed on a front portion of the rotor and supported by the reel main body such that the spool may undergo oscillations back and forth along an axis of rotation of the rotor. A handle is rotatably supported on a side of the reel main body. Within the reel main body are the following: a rotation transmission mechanism for rotating the rotor about the spool, an oscillating mechanism for causing the spool to oscillate along the rotor's axis of rotation, and a control device that prevents reverse rotation of the rotor.

The rotation transmission mechanism includes a master gear shaft, a master gear fixed to the master gear shaft, and a pinion gear. The master gear shaft is supported in the reel main body and extends laterally between opposite sides of the reel main body (left and right sides of the reel main body). The master gear is disposed within the reel main body. The pinion gear has gear teeth engaged with corresponding gear teeth formed on the master gear. The rotor is fixedly coupled to an end of the pinion gear for rotation therewith.

The oscillating mechanism includes, for instance, an intermediate gear, a threaded shaft, a slider, and a sliding guide. The intermediate gear is coupled with the pinion gear for rotation in response to rotation of the pinion gear. The threaded shaft is disposed parallel to a spool shaft, with the intermediate gear coupled to one end thereof. The slider is engaged with the threaded shaft via the sliding guide such that the slider moves in response to rotation of the threaded shaft. The spool shaft is axially coupled to the slider such that the spool shaft oscillates back and forth with the slider.

Grease is applied to each of the above mentioned moving members to reduce friction, whereby members move more efficiently.

The reverse rotation prevention mechanism is located toward a front portion of the reel main body. One end of the spool shaft and an end of the pinion gear extend out of the front of the reel main body through a bore in the reel main body such that the spool and the rotor may be supported thereon, respectively. Ends of the master gear shaft extend out of bores in the opposite sides of the reel main body such that the handle may be attached to the master gear shaft from either of the two opposite ends of the master gear shaft.

As described above, many moveable members such as the spool shaft, the master gear shaft, and the pinion gear extend out from the reel main body through bores. The bores are formed such that there are gaps between the bores and the moveable members that pass through the bores to allow smooth movement of the moveable members. There are also gaps between the reel main body and stationary members such as the reverse rotation prevention mechanism.

It is possible for liquid such as water to enter the reel main body through the gaps between the bores and the moveable members, and between the stationary members and the reel main body. When the reel main body is being cleaned, it is also possible for water and/or detergent to enter the reel main body. The grease applied to the conventional moveable members has been relatively highly viscous and durable and usually continues to provide lubrication even when liquid enters inside the reel main body from the gaps.

PROBLEM TO BE SOLVED BY THE INVENTION

Since highly viscous and durable grease is applied to rotation transmission mechanisms and oscillating mechanisms of conventional spinning reels, it is difficult to improve the efficiency in rotating the handle because of the resistance of the grease. Specifically, it is difficult to reduce the amount of energy necessary to rotate the handle in part because of the viscosity of the grease. Also, once seawater that entered inside the reel main body dries, deposits such as crystals of salts remain. When the deposits are trapped between gears or between rollers of a bearing, smoothness of rotation is affected.

SUMMARY OF THE INVENTION

The object of the invention is to improve the efficiency in rotary action of a handle of a spinning reel while maintaining smoothness of rotation.

In accordance with one aspect of the present invention, a water-proof spinning reel prevents liquid from entering an interior space thereof. The interior space is defined with a reel main body of the spinning reel. The water-proof spinning reel includes a moveable member that extends outward from within the reel main body. A stationary member is fixed to the reel main body. A seal member is disposed about the movable member contacting the moveable member and at least one of the reel main body and the stationary member.

Preferably, the seal member is made of an elastic material.

Preferably, the moveable member is a master gear shaft of the spinning reel. A pair of bearings support opposite ends of the master gear shaft within the reel main body. A pair of the seal members are supported on the reel main body, the seal members being disposed adjacent to respective ones of the pair of bearings on opposite sides of the reel main body such that the seal members each contact respective portions of the master gear shaft, the reel main body, and respective ones of the bearings.

Preferably, each of the bearings is a rotary bearing having an outer race coupled to the reel main body, an inner race supporting the master gear shaft, and a roller supported between the outer race and the inner race for rolling therebetween.

Preferably, the seal member has an outer diameter that is slightly smaller than an outer diameter of the outer race.

Preferably, the master gear shaft is formed with a pair of seal contacting portions that contact respective ones of the seal members, the seal contacting portions having an outer diameter that is smaller than an inner diameter of the inner race.

Preferably, the master gear shaft is formed with a hollow interior having a first threaded portion and a second threaded portion, the first threaded portion being a right handed thread and the second threaded portion having a left handed thread.

The spinning reel includes a handle assembly that includes a shaft having a first threaded portion and a second threaded portion. The first threaded portion of the master gear shaft is a right handed thread and the second threaded portion of the master gear shaft has a left handed thread. The first threaded portion of the master gear shaft is engageable with the first threaded portion of the handle assembly, and the second threaded portion of the master gear shaft is engageable with the second threaded portion of the handle assembly.

Preferably, one of the seal members is disposed between the outer race of the bearing and the reel main body. The other of the seal members is disposed between the other of the outer race and a lid member that is fixed to the reel main body.

Preferably, the moveable member is a shaft pivotally supported by the reel main body for controlling a one-way clutch of the spinning reel. The seal member encircles a portion of the shaft and contacts the shaft and the reel main body.

Alternatively, the moveable member is a rotor and the stationary member is a reverse rotation prevention mechanism fixedly supported on the reel main body. The seal member is supported between the rotor and the reel main body so as to contact both the rotor and the reel main body.

Preferably, a cylindrical elastic member adapted to encircle a flange portion formed at a front side of the reel main body and an outer peripheral surface of the reverse rotation prevention mechanism.

In accordance with another aspect of the present invention, a water-proof spinning reel prevents liquid from entering an interior space of a reel main body of the spinning reel. The water-proof spinning reel includes the reel main body and a spool shaft movably supported within the reel main body. A rotor is rotatably supported in the reel main body and a seal member made of an elastic material is disposed between the spool shaft and an end of the rotor contacting the spool shaft and the end of the rotor.

In accordance with yet another aspect of the present invention, a water-proof spinning reel for prevents liquid from entering an interior space of a reel main body of the spinning reel. The water-proof spinning reel includes the reel main body, a member adapted for connection to the reel main body and a seal disposed between the reel main body and the member.

Preferably, the seal is made of an elastic material.

Preferably, the reel main body is formed with a first flange portion that has a semi-cylindrical shape. The member is formed with a second flange portion having semi-cylindrical shape, the first and second flange portions together define a single cylindrical shape. The seal is disposed between contacting surfaces of the first and second flange portions.

Preferably, the reel main body is formed with an opening, and the member is a lid adapted to cover the opening, the seal being disposed between contacting surfaces of the member and the reel main body.

Preferably, the reel main body is formed with an opening and a first flange portion that has a semi-cylindrical shape. The member is formed with a second flange portion having semi-cylindrical shape, the first and second flange portions together define a single cylindrical shape. The spinning reel further includes a lid adapted to cover the opening, the seal being disposed between contacting surfaces of the member and the reel main body, and the first and second flange portions.

In accordance with yet another aspect of the present invention, a water-proof spinning reel for preventing liquid from entering an interior space of a reel main body of the spinning reel. The water-proof spinning reel includes a spool shaft supported within the reel main body, the spool shaft defining a spool axis. The water-proof spinning reel also includes an oscillation movement mechanism for moving the spool axis back and forth along the spool axis. The oscillation movement mechanism is disposed within the reel main body. A portion of the oscillation movement mechanism is supported within bore formed on a rear portion of the reel main body. A seal member disposed on the rear portion of the reel main body prevents water from entering the reel main body via the bore.

With the above water-proof structure for a spinning reel, gaps between the moveable members and the reel main body and/or a stationary member attached to the reel main body is sealed with a seal member. Therefore, it is less likely that liquid enters the interior space of the fishing reel through gaps between the moveable member and the reel main body and/or the stationary member. As a result, grease having a lower viscosity can be utilized to lubricate the various elements within the interior space. Accordingly, resistance from the grease is smaller, whereby efficiency in rotation of the handle is improved. Also, since less liquid enters the interior space, there is a reduction in deposits left when liquid dries. Accordingly, there are fewer deposits trapped between gears and between rollers. Therefore, smoothness of rotation of the handle of the spinning reel can be maintained.

These and other objects, features, aspects and advantages of the present invention will become more fully apparent from the following detailed description of the present invention when taken in conjunction with the accompanying drawings where like reference numerals denote corresponding parts throughout.

DETAILED DESCRIPTION OF THE PREFERRED EMBODIMENT

OVERALL STRUCTURE

Figure 1:
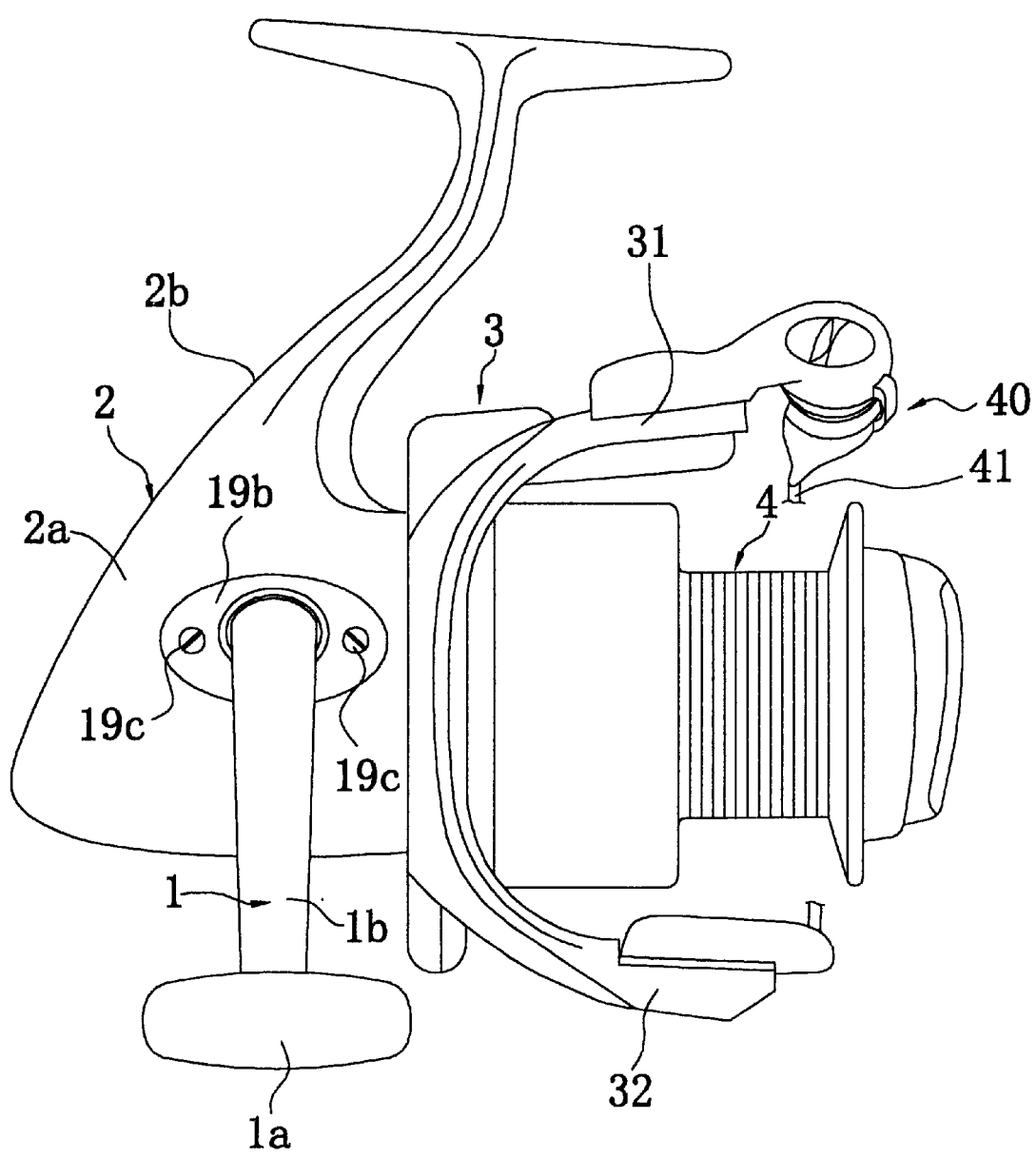
FIG. 1 is a side plan view of a spinning reel in accordance with one embodiment of the present invention showing a handle assembly attached to right side of a reel main body of the spinning reel.
Figure 2:
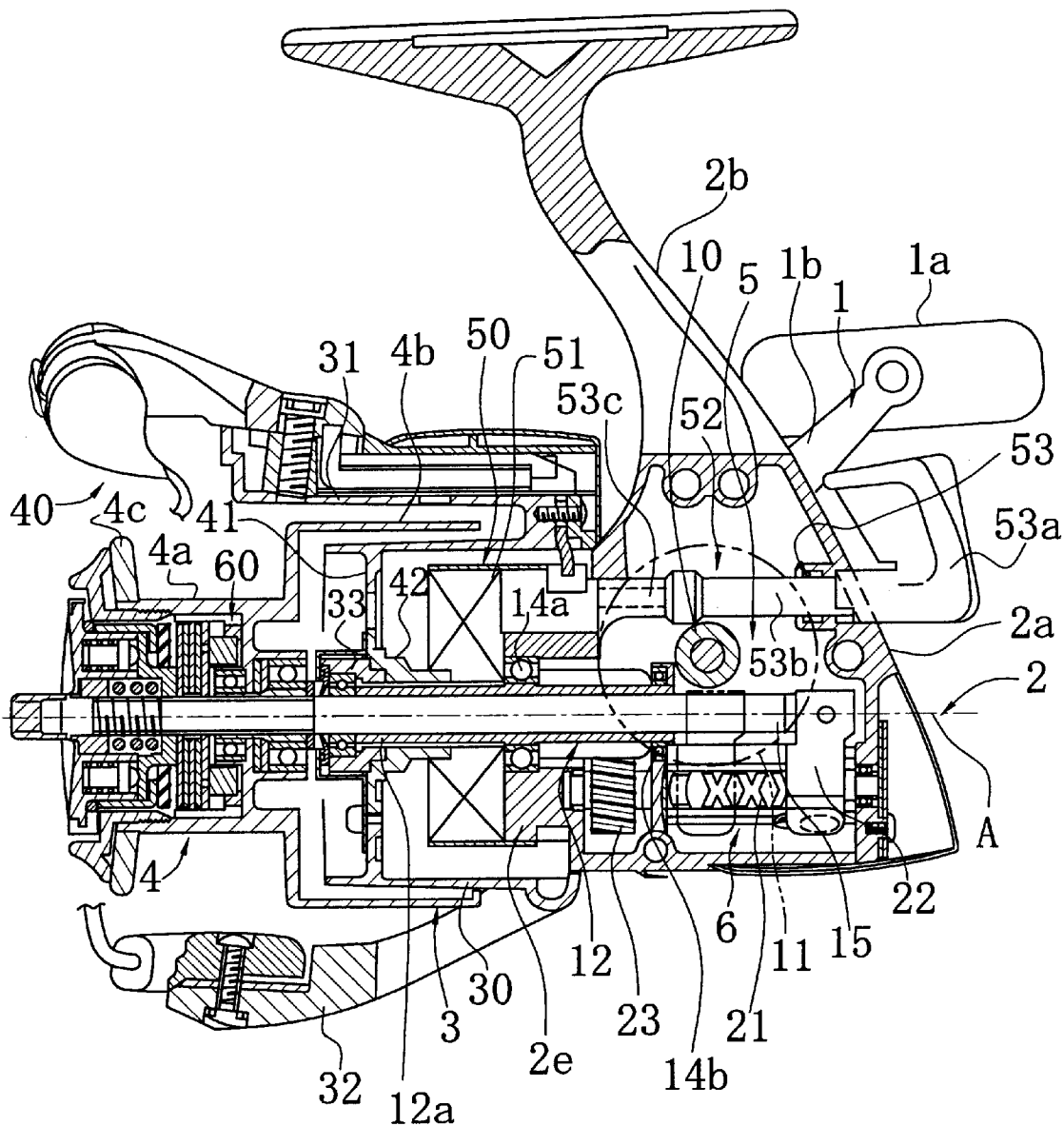
FIG. 2 is a side cross-sectional view of the spinning reel in accordance with the present invention.

A spinning reel in accordance with a first embodiment of the present invention is described below with reference to FIGS. 1 and 2. The spinning reel shown in FIGS. 1, 2, 3 and 4 is, relative to most spinning reels, a large spinning reel that is able to hold about 200 m of size 8 fishline, with the fishline wound about a spool 4, described in greater detail below. The spinning reel includes a reel main body 2, a rotor 3 that is supported on the reel main body 2 about an axis A (FIG. 2), the spool 4, and a handle assembly 1 that is rotatably supported on the reel main body 2. As is described in greater detail below, rotation of the handle assembly 1 with respect to the reel main body 2 causes the rotor 3 to rotate and causes the spool 4 to undergo oscillations along the axis A (FIG. 2) in order to receive the fishline.

The rotor 3 is rotatably supported by a front portion of the reel main body 2 and is rotatable about the above mentioned axis A. The spool 4 has an outer peripheral surface about which the fishline is wound, and is disposed on a front portion of the rotor 3 so as to be movable back and forth (oscillate) along the axis A.

STRUCTURE OF THE HANDLE ASSEMBLY

Figure 3:
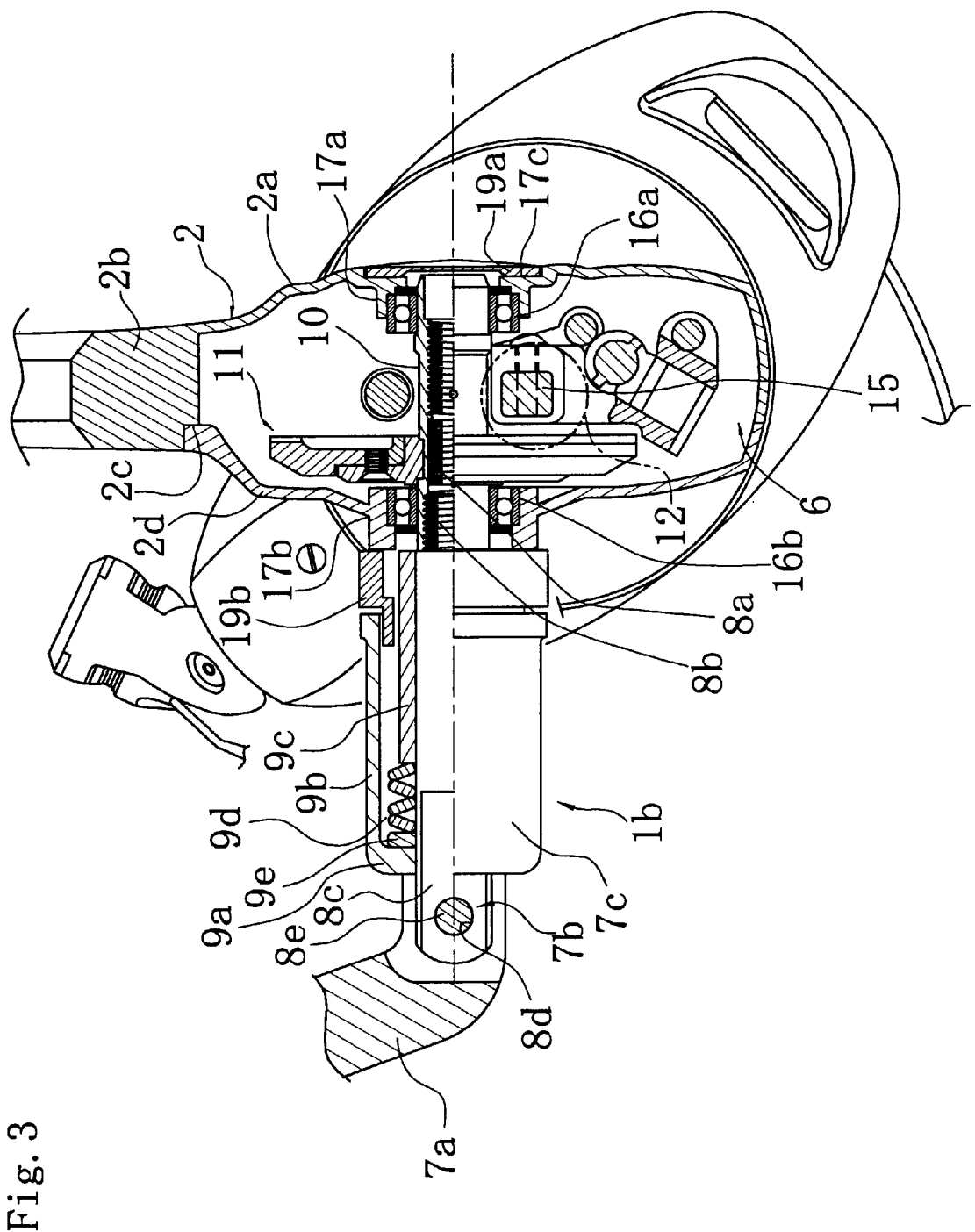
FIG. 3 is a back side cross-sectional view of the spinning reel depicted in FIG. 1 with the handle assembly attached on a left side of the reel main body.

As shown in FIG. 3, the handle assembly 1 is threaded into a master gear shaft 10, as is described below. As shown in FIG. 1, the handle assembly 1 includes a T-shaped handle portion 1a and a L-shaped crank arm 1b. The handle portion 1a is rotatably attached to an end of the crank arm 1b. With reference again to FIG. 3, the crank arm 1b includes an arm portion 7a, a shaft portion 7b, and an attachment portion 7c. A base end of the arm portion 7a is pivotally coupled to the shaft portion 7b. The attachment portion 7c has a cup-like shape and extends around a portion of the shaft portion 7b, as is described in greater detail below. The attachment portion 7c is substantially concentric with the shaft portion 7b with the shaft portion 7b extending beyond the end of the attachment portion 7c such that the distal end of the shaft portion 7c is threaded into the master gear shaft 10.

The shaft portion 7b has a rod-shaped cross section. On the distal end (toward the right side of FIG. 3) of the shaft portion 7b, a first male screw portion 8a and a second male screw portion 8b are formed concentrically and axially next to each other. The first male screw portion 8a is a right-handed screw (a screw that is threaded in when it rotates in a clockwise direction). The second male screw portion 8b is a left-handed screw (a screw that is threaded in when it rotates in a counter-clockwise direction) that has a larger diameter than the first male screw portion 8a. Accordingly, the handle assembly 1 can be attached to either the right side of the reel main body 2 as shown in FIGS. 1 and 2, or the left side of the reel main body 2 as shown in FIG. 3.

On a base end of the shaft portion 7b, flat surfaces 8c are formed parallel to each other. A bore 8d is formed on the flat surfaces 8c for receiving therein a pivot pin 8e which pivotally supports the arm portion 7a on the shaft portion 7b. The arm portion 7a is pivotally coupled to the shaft portion 7b via the pivot pin 8e.

The attachment portion 7c includes a contacting portion 9a, a shaft cover 9b, and a pressure member 9c. The contacting portion 9a defines an end surface of the arm portion 7a. The shaft cover 9b has a cylindrical-shape that encircles an outer periphery of a portion of the shaft portion 7b but is spaced apart from the shaft portion 7b. The pressure member 9c surrounds a portion of the shaft portion 7b and is located between the outer surface of the portion of the shaft portion 7b and the shaft cover 9b.

The contacting portion 9a of the attachment portion 7c is formed with an opening that engages the flat surfaces 8c of the shaft portion 7b such that the shaft cover 9b cannot rotate relative to the shaft portion 7b. In this way, the shaft portion 7b can be rotated by rotation of the shaft cover 9b such that the shaft portion 7b may be threaded into the master gear shaft 10 and later removed (unthreaded) from the master gear shaft 10 by rotation of the shaft cover 9b. An end of the shaft cover 9b extends around a tubular cover 19b that is supported on the reel main body 2.

The pressure member 9c is tubular in shape and is coupled to the shaft portion 7b but is rotatable and axially movable with respect to the shaft 7b, as is described further below. The end of the pressure member 9c contacts the master gear shaft 10 while the handle assembly 1 is attached thereto. On the outer periphery of the shaft portion 7b between the pressure member 9c and the contacting portion 9a of the shaft cover 9b there are four plate springs 9d that are arranged as two pairs of plate springs. Further, between the contacting portion 9a and the plate springs 9d a washer 9e is disposed encircling the shaft portion 7b. The two pairs of plate springs 9b contact each other at outer peripheries thereof. When the handle assembly 1 is attached to the master gear shaft 10 the plate springs 9d are compressed between the pressure member 9c and the washer 9e such that the biasing force of the plate springs 9d biases the pressure member 9c into firm engagement with the master gear shaft 10 thereby preventing the shaft portion 7b from becoming unscrewed from the master gear shaft 10. Specifically, the biasing force that urges the pressure member 9c against the master gear shaft 10 helps to retain one of the first male screw 8a or the second male screw 8b in threaded engagement with the corresponding threads in the master gear shaft 10. As well, with the plate springs 9c under compression, the contacting portion 9a further contacts an end surface of the arm portion 7a such that the arm portion 7a is not able to pivot about the pin 8e.

When the handle assembly 1 is to be removed from the master gear shaft 10, the shaft cover 9b is rotated to loosen the threaded engagement between the shaft portion 7b and the master gear shaft 10. As the shaft portion 7b begins to become unscrewed (unthreaded) from the master gear shaft 10, the plate springs 9d expand and are no longer compressed, and the contacting portion 9a becomes separated from the shaft cover 9b. The contacting portion 9a also comes out of contact with the end surface of the arm portion 7a of the crank arm 1b. Accordingly, the crank arm 1b can easily pivot about the pivot pin 8e. When the handle assembly 1 is threaded in by rotating the shaft cover 9b, the contacting portion 9a contacts the end surface of the arm portion 7a whereby the handle assembly 1 is retained rigidly in an attachment state where the crank arm 1b cannot pivot about the pivot pin 8e. While the handle assembly 1 is attached to the master gear shaft 10, the plate springs 9d bias the pressure member 9c towards the master gear shaft 10, whereby the attachment of the handle assembly 1 to the master gear shaft 10 does not come loose easily.

STRUCTURE OF REEL MAIN BODY

As is shown in FIGS. 1, 2 and 3, the reel main body 2 includes a reel body 2a and a leg 2b. The reel body 2a has an opening 2c on a side portion thereof (the opening 2c is open toward the left side of FIG. 3). The leg 2b has a shape resembling the letter T and is shaped to connect the reel main body to a portion of a fish rod (not shown). The leg 2b is formed on the reel body 2a integrally therewith, and extends in an upward direction therefrom. The opening 2c is shaped to receive a lid member 2d thereby closing the reel main body.

As shown in FIG. 2, inside the reel body 2a there is a space for many elements which define several mechanisms. The space within the reel body 2a is accessed via the opening 2c by removing the lid member 2d. Within the space within the reel body 2a are a rotor driving mechanism 5 for rotating the rotor 3 in response to rotation of the handle assembly 1, and an oscillating mechanism 6 that moves the spool 4 back and forth along the axis A such that the fishline (not shown) may be uniformly wound around the spool 4 by rotation of the rotor 3.

Figure 4:
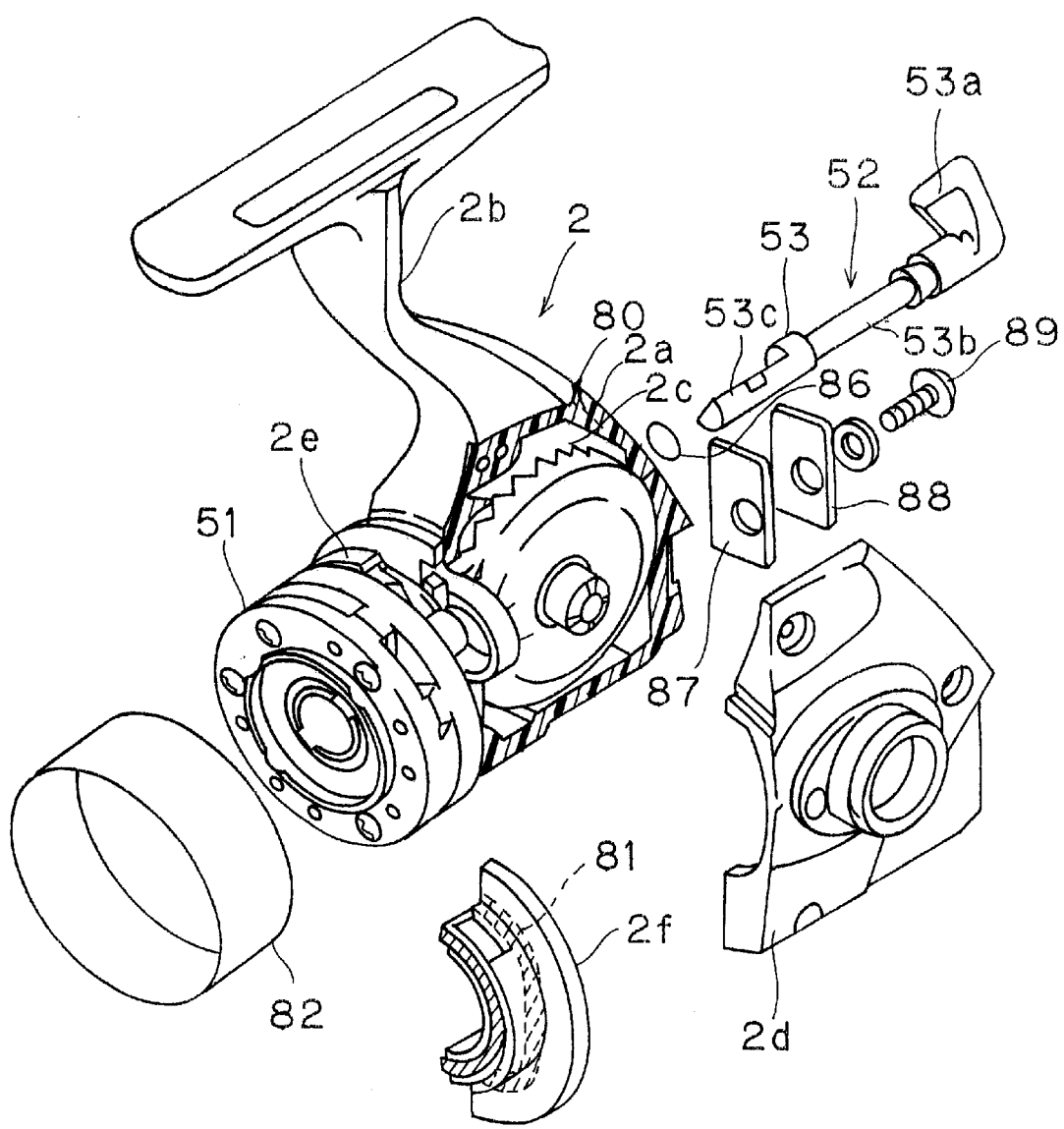
FIG. 4 is a fragmentary perspective, exploded view of the reel main body of the spinning reel depicted in FIG. 1.

As shown in FIG. 3, the opening of the reel body 2a is closed and sealed by a lid member 2d. The lid member 2d is fixedly connected to an outer periphery of the opening 2c by bolts. On a peripheral portion of the opening 2c, a liquid gasket 80 is applied as shown in FIG. 4 in hatched shading, to seal a gap between the lid member 2d and the opening 2c, thereby preventing liquid from entering the reel body 2a and contaminating the moving elements of the mechanism therein. It should be appreciated that the hatched shading in FIG. 4 representing the liquid gasket 80 is not an indication of a cross-section, but rather is an indication of the liquid gasket 80.

FIG. 4 shows a first flange portion 2e formed on a front portion of the reel body 2a. The first flange portion 2e generally has a semi-cylindrical shape, or in other words is approximately half of a cylinder in shape. The first flange portion 2e is formed on the reel body 2a and extends forward in front of the opening 2c. A second flange portion 2f is fixed to the first flange portion 2e and the reel body 2a. The second flange portion 2f has a semi-cylindrical shape and completes a cylinder shape with first flange portion 2e. A one-way clutch 51 of a reverse rotation prevention mechanism 50 is fixed to the first flange portion 2e (and second flange portion 2f, as shown in FIG. 2. The one-way clutch 51 allows the rotor 3 to rotate in one direction, but prevents the rotor 3 from rotating in an opposite direction.

As is indicated in FIG. 4, the second flange portion 2f is a separate member from the reel body 2a and makes it easy to install the various elements that are retained within the reel body 2a. The configuration of the second flange portion 2f is such that the master gear 11 is closer to a front of the interior of the reel body 2a than in prior art configurations. A water repellent seal 81 made of an elastic material is disposed on surfaces of the second flange portion 2f that contact the first flange portion 2e and the lid member 2d. As shown in FIG. 4, the water repellent seal 81 is disposed in a semi-circular shape on a rear surface of the second flange portion 2f facing the lid member 2d. The water repellent seal 81 is also disposed on surfaces that contact the first flange portion 2e.

Figure 6:
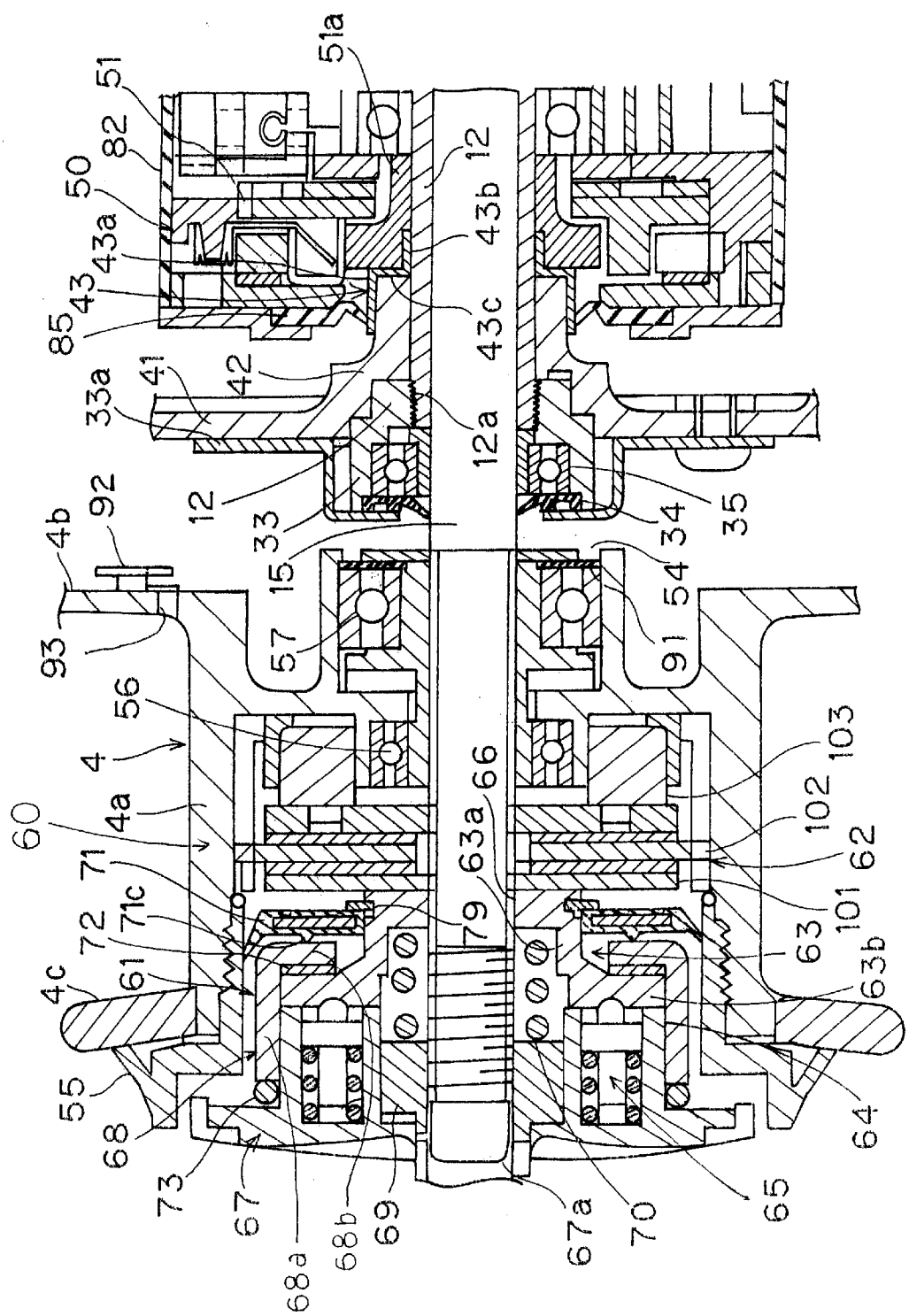
FIG. 6 is a fragmentary, cross sectional side view of a front portion of the spinning reel depicted in FIG. 1 on a slightly enlarged scale.

The one-way clutch 51 has a shape corresponding to the cylinder defined by the combination of the first flange portion 2e and the second flange portion 2f. A tubular seal ring 82 made of an elastic material such as NBR is disposed on an outer periphery of the one-way clutch 51 and the first and second flange portions 2e and 2f, as shown in FIG. 6, such that any outer peripheral gaps formed on the one-way clutch 51 and the first and second flange portions 2e and 2f, along with a gap formed between the one-way clutch 51 and the first and second flange portions 2e and 2f are all sealed.

Figure 5:
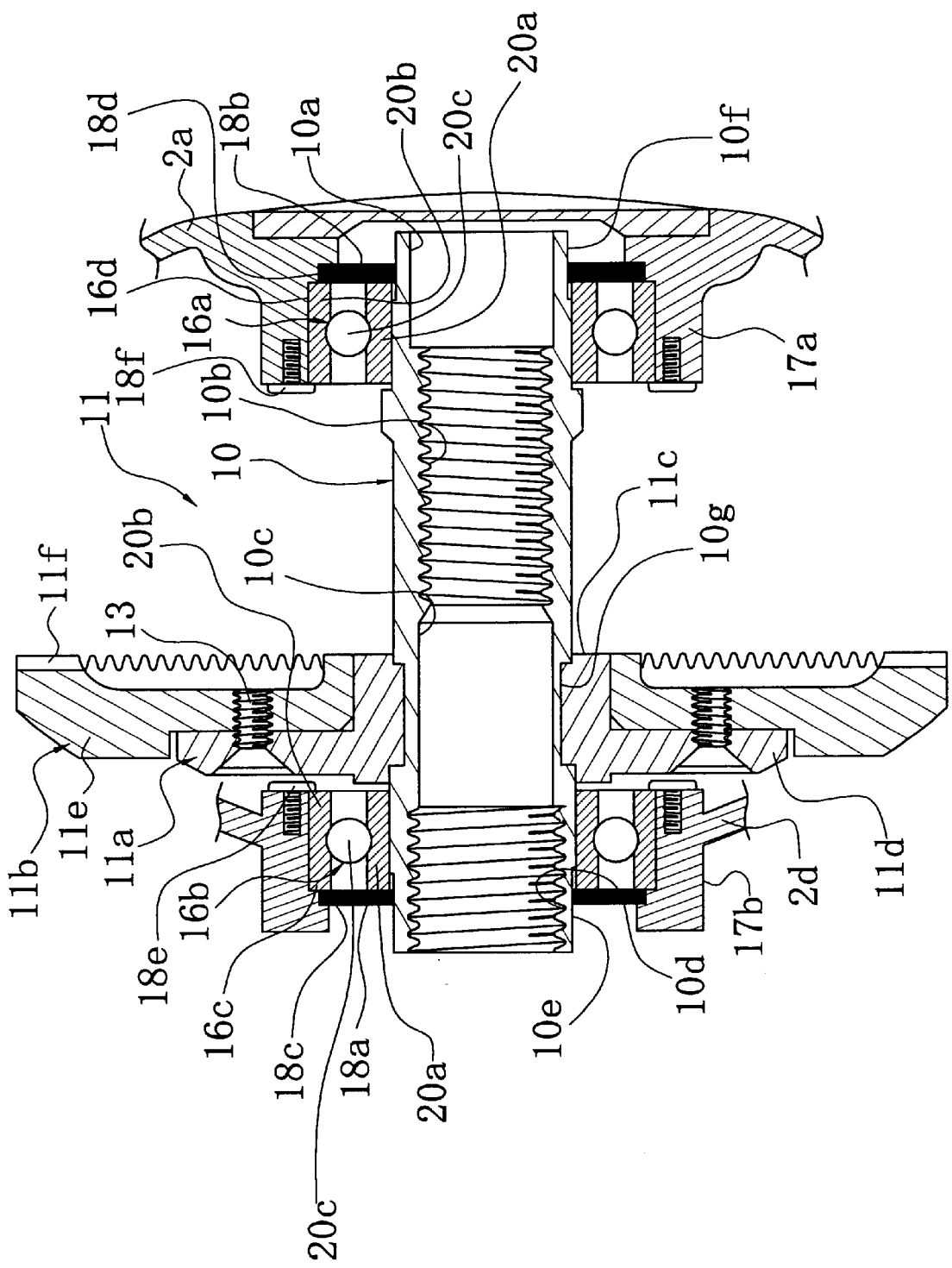
FIG. 5 is a fragmentary cross-sectional view of a master gear of the spinning reel depicted in FIG. 1 on a slightly enlarged scale.

As shown in FIGS. 3 and 5, a cylindrical boss portion 17a is formed on one side of the reel body 2a (toward the right side of FIG. 5). The boss portion 17a extends inwardly within the reel body 2a for supporting a bearing 16a which supports one end of the master gear shaft 10. Another boss portion 17b is formed on the lid member 2d opposing the boss portion 17a, and with the lid member 2d fixed in the opening 2c, the boss portion 17a and boss portion 17b are axially aligned. The boss portion 17b extends both inward and outward from the space within the reel body 2a for supporting a bearing 16b which further supports another end of the master gear shaft 10 (on the left side of FIG. 5). The boss portion 17a of the reel body 2a is covered by a shaft cover 19a. However, the shaft cover 19a can be removed and the handle assembly 1 may be threaded into the master gear shaft 10 via the opening defined by the bearing 16a.

The tubular cover 19b may be coupled to either of the boss portions 17a or 17b on opposite sides of the reel body 2a, depending upon which side of the reel body 2a the handle assembly 1 is attached to (i.e. for a left-handed user or a right handed user). The tubular cover 19b prevents water from entering the reel main body 2a. As shown in FIG. 1, the shaft cover 19a and tubular cover 19b are oval members, both adapted to be coupled to either boss portion 17a and 17b by two small bolts 19c. The surface of the reel body 2a around the boss portion 17a is formed with an oval recess 17c for attachment of either the shaft cover 19a or the tubular cover 19b.

STRUCTURE OF THE ROTOR DRIVING MECHANISM

As shown in FIG. 3, the rotor driving mechanism 5 includes a master gear 11 to which the handle assembly 1 is non-rotatably attached via the master gear shaft 10. The rotor driving mechanism 5 also includes the pinion gear 12 that has gear teeth engaged with corresponding gear teeth formed on the master gear 11.

As shown in FIG. 5, the master gear 11 includes the master gear shaft 10, a gear attachment portion 11a integrally formed with the master gear shaft 10, and the gear member 11b detachably coupled to the gear attachment portion 11a.

The master gear shaft 10 is a hollow member made of a stainless steel material. Both ends of the master gear shaft 10 are rotatably supported by the reel body 2a and the lid member 2b via the bearings 16a and 16b. The bearings 16a and 16b are rotary bearings, each having an inner race 20a, an outer race 20b, and ball bearings 20c. Seal rings 18a and 18b made of an elastic material such as NBR are disposed adjacent to the outer peripheral surface of the master gear shaft 10, and axially outward from the internal space of the reel body 2a, the inner race 20a and the outer race 20b of the bearings 16a and 16b, respectively.

The seal rings 18a and 18b are washer-like members, tightly retained within seal coupling recesses 18c and 18d, which are formed in the lid member 2d and reel body 2a, respectively, axially outward from the bearings 16a and 16b. Inner radiuses of the seal coupling recesses 18c and 18d (outer radiuses of the seal rings 18a and 18b) are smaller than outer radiuses of the bearings 16a and 16b. Axial lengths of the seal coupling recesses 18c and 18d are slightly smaller than thicknesses of the seal rings 18a and 18b. Inner peripheries of the seal rings 18a and 18b are disposed adjacent to seal surfaces 10e and 10f of the master gear shaft 10. Outer radiuses of the seal surfaces 10e and 10f are smaller than the radiuses of the portion of the main gear shaft 10 that contacts the bearings 16a and 16b.

Small bolts 18e and 18f are threaded into the boss portions 17a and 17b contacting the outer races 20b of the bearings 16a and 16b. The small bolts 18e and 18f through the outer races 20b force the seal rings 18a and 18b into firm engagement with the seal coupling recesses 18c and 18d such that the seal rings 18a and 18b seal outer peripheral portions thereof without rotating with the master gear shaft 10. Since the seal surfaces 10e and 10f have smaller radiuses than the bearing attachment surfaces, it is less likely that the seal surfaces 10e and 10f are damaged. Further, after repeated attachment and detachment of the handle assembly 1, if the master gear shaft 10 should be deformed thereby extending farther in a radially outward direction, the seal rings 18a and 18b may still provide a reliable seal. Also, since the seal coupling recesses 18c and 18d have smaller radiuses than the outer races 20b, thrust forces that are applied to the bearings 16a and 16b can be directly supported by the reel body 2a and the lid member 2d.

As shown in FIG. 5, the master gear shaft 10 is formed with a first through bore 10a, a first female screw portion 10b, a second through bore 10c, and a second female screw portion 10d all formed concentrically and axially aligned in the above recited order from the right side of FIG. 4 to the left side of FIG. 5. The second female screw portion 10d opens to the left end of the master gear shaft 10. The axial length of the first through bore 10a is substantially the same as the axial length of the second female screw portion 10d. The first through bore 10a has a larger radius than the second female screw portion 10d, such that the second male screw portion 8b of the shaft portion 7b can be inserted therethrough. The first female screw portion 10b is formed with right-handed screw threads, into which the first male screw portion 8a of the shaft portion 7b can be threaded. The axial length of the first female screw portion 10b is slightly longer than the axial length of the first male screw portion 8a. The axial length of the second through bore 10c is substantially the same as the axial length of the first female screw portion 10b. The second through bore 10c has a larger diameter than the first female screw portion 10b, such that the first male screw portion 8a can be inserted therethrough. The second female screw portion 10d is threaded with left-handed screw threads, into which the second male screw portion 8b of the shaft portion 7b can be threaded.

On portions of the outer surface of the master gear shaft 10 are flat surfaces 10g formed parallel to each other for engagement with corresponding surfaces of the gear attachment portion 11a. The gear attachment portion 11a is formed on the flat surfaces 10g integrally with the master gear shaft 10 by press fitting the master gear shaft 10 into the gear attachment portion 11a or other means. The gear attachment portion 11a is made of a zinc alloy, which can be molded integrally with a stainless alloy easily. The gear attachment portion 11a includes a boss portion 11c and a flange portion 11d. The boss portion 11c is fixedly coupled to the master gear shaft 10, as described above. The flange portion 11d is formed on an outer periphery of the boss portion 11c. The gear member 11b is detachably coupled to the flange portion 11d by a plurality of bolts 13. The gear member 11b is a disk shaped member made by forging an aluminum alloy. Therefore, the gear member 11b is relatively light. The gear member 11b includes a disk portion 11e and the face gear portion 11f. The disk portion 11e is non-rotatably coupled to the flange portion 11d. The face gear portion 11f is formed on the outer peripheral portion of the disk portion 11e, and is adapted to engage gear teeth formed on the pinion gear 12.

As shown in FIG. 2, the pinion gear 12 is a tubular member disposed extending around a portion of the axis A in a generally central portion of the reel body 2a. The pinion gear 12 is restrained within the reel body 2a against axial movement along the axis A, but rotates about a spool shaft 15. A front portion 12a of the pinion gear 12 extends through a central portion of the rotor 3. The front portion 12a is fixed to the rotor 3 by a nut 33. The pinion gear 12 is rotatably supported by the reel body 2a at two spaced axially spaced apart portions via bearings 14a and 14b, respectively. The spool shaft 15 extends completely through the pinion gear 12. The pinion gear 12 is formed with gear teeth engaged with the gear teeth on the master gear 11 and further engaged with gear teeth on an intermediate gear 23 of an oscillating mechanism 6, described in greater detail below.

ROTOR STRUCTURE

As shown in FIG. 2, the rotor 3 includes a cylindrical portion 30 fixed to the pinion gear 12, first and second rotor arms 31 and 32, and a bail arm 40. The first and second rotor arms 31 and 32 are formed on side portions of the cylindrical portion 30 opposed to and parallel to each other. The bail arm 40 is a mechanism for guiding the fishline on to the spool 4 as the rotor 3 rotates about the spool 4. The cylindrical portion 30 and the rotor arms 31 and 32 are made of a material such as an aluminum alloy, and are formed integrally together as a one-piece unit. A front central portion of the cylindrical portion 30 is non-rotatably fixed to the front portion 12a of the pinion gear 12 by the nut 33, as described above. A rotor bearing 35 is fitted between the nut 33 and the spool shaft 15. The outer race of the rotor bearing 35 is held in a recess in the nut 33, and the inner race of the bearing 35 is fixedly mounted to the shaft 15. A seal 34 is fitted into a recess in the nut 33 that is axially outward from and diametrically larger than the recess for the bearing 35. A locking cap 33a is fastened over the nut 33 to the front wall and retains the seal 34.

A front wall 41 is formed on a front portion of the cylindrical portion 30. A boss portion 42 is formed on a central portion of the front wall 41. The boss portion 42 has a through bore formed in the center thereof. The front portion 12a of the pinion gear 12 and the spool shaft 15 extend through the through bore of the boss portion 42, such that the pinion gear 12 is non-rotatably coupled to the through bore.

A reverse rotation prevention mechanism 50 is disposed within the cylindrical portion 30, adjacent to the boss portion 42. The reverse rotation prevention mechanism 50 includes a one-way clutch 51 and a switching mechanism 52. The one-way clutch 51 is a roller type one-way clutch, in which an inner race 51a, which is non-rotatably coupled to the pinion gear 12, freely rotates. The switching mechanism 52 switches the one-way clutch 51 between an active state, in which reverse rotation is prevented, and an inactive state, in which reverse rotation is allowed.

As shown in FIG. 6, a sleeve 43 made of a stainless alloy is retained between the inner race 51a and the boss portion 42 of the rotor 3. The sleeve 43 is a thin tubular member having a large diameter portion 43a, a small diameter portion 43b, and a disk portion 43c extending therebetween. The large diameter portion 43a is coupled to an outer periphery of the boss portion 42, while the small diameter portion 43b is coupled to the inner race 51a and the pinion gear 12. The disk portion 43c that connects the large portion 43a and the small portion 43b is disposed between the boss portion 42 and the inner race 51a.

A shaft seal 85 having a lip is retained on a front portion of the one-way clutch 51. The lip contacts an outer peripheral surface of the large diameter portion 43c of the sleeve 43. Since the disk portion 43c is disposed between the boss portion 42 and the inner race 51a, it is unlikely that liquid can enter the cylindrical member 30 (FIG. 2) through a gap formed in the inner periphery of the sleeve 43. Therefore, by sealing with the shaft seal 85 an outer peripheral surface of the sleeve 43, liquid does not enter inside the reel main body 2 through gaps around the one-way clutch 51. The sleeve 43 allows a precise positioning of the shaft seal 85 relative to the rotor 3. Without the sleeve 43, if the rotor 3 is offset from the shaft seal 85 while the rotor is coupled to the pinion gear 12, the shaft seal 85 cannot seal properly. By utilizing the sleeve 43, the shaft seal 85 can be more easily positioned relative to the rotor 3 such that the shaft seal 85 can seal properly.

Figure 7:
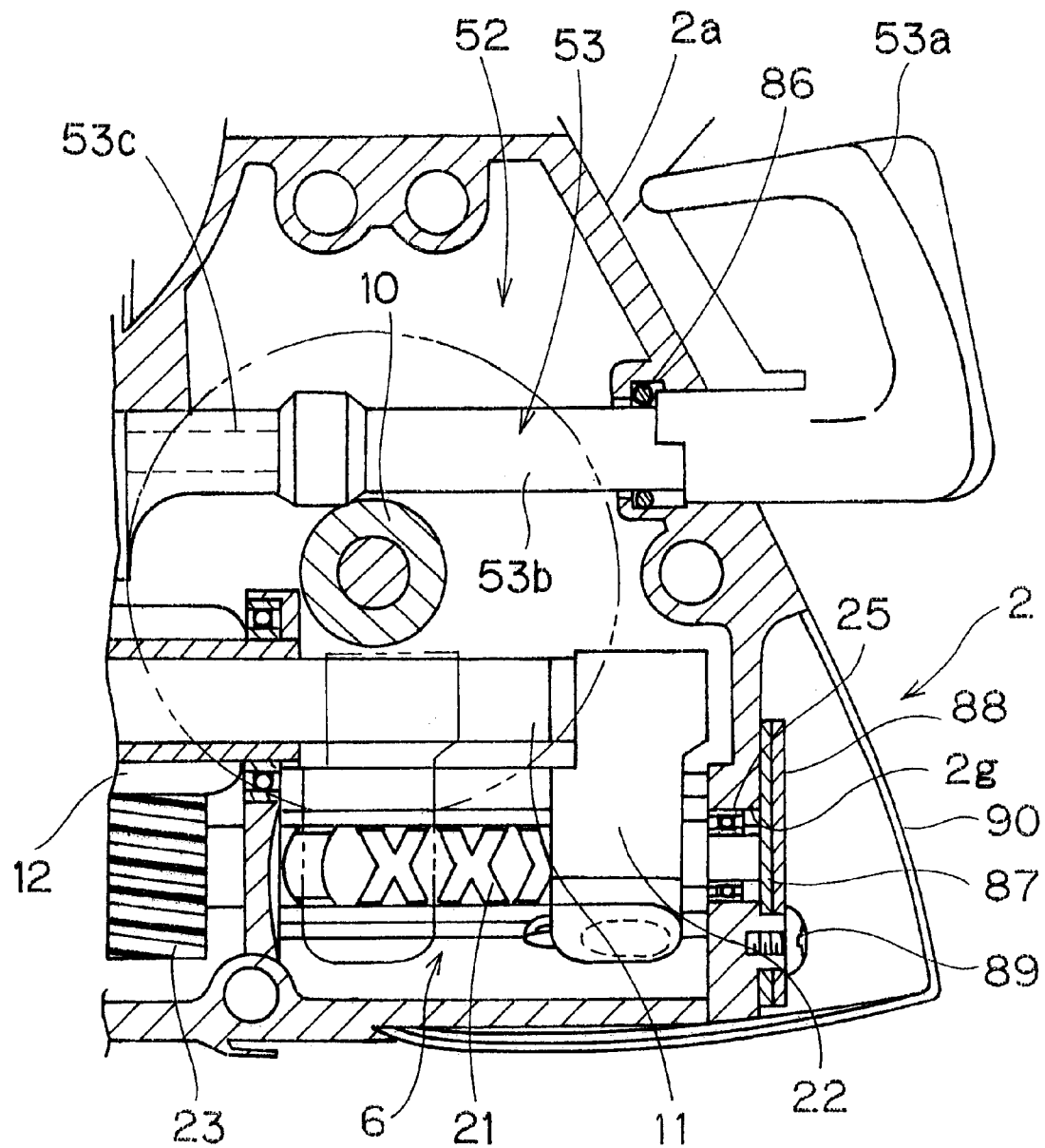
FIG. 7 is a fragmentary, cross sectional side view of a rear portion of the spinning reel depicted in FIG. 1 on a slightly enlarged scale.

As shown in FIGS. 2 and 4, the reel body 2a includes a switching mechanism 52 that has a stopper shaft 53. The stopper shaft 53 is pivotably coupled to the reel body 2a so as to be able to move between an inactive position and an active position. As shown in FIG. 7, the stopper shaft 53 has a stopper handle 53a, a shaft portion 53b, and a cam portion 50c. The stopper handle 53a projects in a rearward direction through the reel body 2a. The stopper handle 53a is fixedly connected to the shaft 53b. The cam portion 50c is fixedly coupled to a front end of the shaft portion 53b. An O-shaped ring 86 is installed on the shaft portion 53b, at an inward portion relative to the stopper handle 53a. The O-shaped ring 86 prevents liquid from entering the reel main body 2a through gaps that may exist around the stopper shaft 53. A front portion of the cam portion 53c contacts the one-way clutch 51, so as to switch the one-way clutch 51 between the inactive position and the active position according to pivoting of the stopper shaft 53.

STRUCTURE OF THE OSCILLATING MECHANISM

As shown in FIG. 7, the oscillating mechanism 6 includes a threaded shaft 21 disposed below and parallel to the spool shaft 15, a slider 22 adapted to move back and forth along the threaded shaft 21, and an intermediate gear 23 fixed to a front end of the threaded shaft 21. A rear end of the threaded shaft 21 is rotatably supported via the bearing 25 in a support bore 2g that is formed on a rear portion of the reel body 2a. The support bore 2g is sealed by a pressure lid 88. A planar seat packing member 87 is disposed on a rear portion of the reel body 2a to prevent liquid from entering inside the reel main body 2a through a gap between the pressure lid 88 and the reel body 2a. The seat packing member 87 is disposed between the pressure lid 88 and the rear portion of the reel body 2a, and is fixedly coupled to the rear portion of the reel body 2a by the pressure lid 88 which is fixedly coupled the rear portion of the reel body 2a by a small bolt 89. The rear portion of the reel body 2a is covered by a protection cover 90.

The slider 22 is movably supported by two guide shafts 24 that are disposed parallel to the threaded shaft 21. A rear end of the spool shaft 15 is non-rotatably coupled to the slider 22. The intermediate gear 23 couples with the pinion gear 12.

SPOOL STRUCTURE

As shown in FIG. 2, the spool 4 is disposed between the first rotor arm 31 and the second rotor arm 32 of the rotor 3. A central portion of the spool 4 is coupled to the front end of the spool shaft 15 via a drag mechanism 60. The spool 4 includes a winder body 4a, a skirt portion 4b, and a flange board 4c. The fishline is wound about an outer periphery of the winder body 4a. The skirt portion 4b is formed integrally with a back portion of the winder body 4a. The flange board 4c is fixed to a front end of the winder body 4a. The winder body 4a is a cylindrical member, having the outer peripheral surface that is parallel to the spool shaft 15. As shown in FIG. 6, the winder body 4a is rotatably coupled to the spool shaft 15 by two bearings 56 and 57.

The skirt portion 4b is disk shaped and extends in a radially outward direction from a rear end portion of the winder body 4a. A thread through bore 93 is formed on a portion of the skirt portion 4b adjacent to the winder body 4a. One end of the fishline (not shown) wound around the winder body 4a extends through the bore 93 and is anchored to the skirt portion 4b by tying the fishline to a projection 92 formed on a rear surface of the skirt portion 4b radially outward from the bore 93. By tying an end of the fishline to the projection 92, a knot at the end of the fishline is not wound in the winder body 4a. Therefore, the fishline can be wound evenly about the winder body 4a when a thin fishline is used. As a result, the fishline can be pulled out from the spool smoothly, with an improved smoothness of rotation.

The flange board 4c is an annular ring-shaped member having an outer peripheral portion that projects in a front direction relative to the reel main body 2a. The flange board 4c is fixedly coupled to the winder body 4a by a spool ring collar 55 that is threaded to an inner periphery of the winder body 4a.

The spool 4 is supported on the bearing 57 that is retained in position at one end thereof on the spool shaft 15 by a positioning washer 54 that is coupled to the spool shaft 15. A seal ring 91 made of an elastic material is disposed between the positioning washer 54 and the bearing 57, adjacent to inner and outer races of the bearing 57 and a portion of the spool 4 where the bearing 57 is retained. The seal ring 91 is a washer-shaped member for preventing liquid from entering the drag mechanism 60 through a rear portion of the spool 4.

DRAG MECHANISM STRUCTURE

As shown in FIGS. 2 and 6, an adjustable drag mechanism 60 is disposed between the spool 4 and the spool shaft 15 for applying a drag force to the spool 4. As shown in FIG. 6, the drag mechanism 60 includes a handle portion 61 and a friction portion 62. The handle portion 61 allows the amount of drag force to be controlled manually. The friction portion has a plurality of disks that are pressed into friction engagement with one another and further coupled to the spool 4.

The handle portion 61 includes a first member 63, a second member 64, and a sound mechanism 65. The first member 63 is rotatably and axially movably coupled to the spool shaft 15. The second member 64 is disposed at an axially front position with respect to the first member 63. The spool shaft 15 is threaded into the second member 64. The sound mechanism 65 is coupled between the first member 63 and the second member 64.

The first member 63 is a cylindrical member with a flange, having a cylindrical portion 63a and a flange portion 63b is a ring having a larger diameter than the cylindrical portion 63a. An oval coupling bore 66 is formed on an inner peripheral portion of the cylindrical portion 63a for non-rotatably coupling with the spool shaft 15. A rear end surface of the cylindrical portion 63a of the first member 63 is disposed adjacent to a friction surface 62. A seal plate 71 is coupled between the cylindrical portion 63a of the first member 63 and an inner peripheral surface of the spool ring collar 55 for preventing liquid from entering inside the spool 4. The seal plate 71 is a seal member made by inserting a ring-shaped member made of a stainless material into a plate-shaped elastic member made of NBR. The seal plate 71 has a lip on an outer peripheral portion thereof. The seal plate 71 is biased by a snap ring 79 in a direction shown as a leftward direction in FIG. 6. A ring-shaped projection 71c is formed on the seal plate 71, which extends to the left side of FIG. 6. The projection 71c contacts a cover member 68, which is described below, for preventing the liquid from entering from outside the spinning reel.

The second member 64 is disposed opposite the first member 63 so as to be rotatable relative to the first member 63. The second member 64 includes a handle body 67 and a cover member 68. The handle body 67 is disposed on a front end of the spool shaft 15 (to the left side of FIG. 6 relative to the first member 63). A front end of the cover member 68 is fixedly coupled to the handle body 67. The first member 63 is relatively rotatably disposed within the cover member 68.

The handle body 67 is a disk-shape member having a trapezoid-shaped handle 67a which is formed on a front surface thereof and extends toward the front of the spinning reel (the left side of FIG. 6). A nut 69, which is threaded into the front end of the spool shaft 15, is non-rotatably and axially movably coupled to an inner periphery of the handle body 67. A coil spring 70 is disposed in a compressed manner on an outer periphery of the spool shaft 15, between the second member 64 and the nut 69.

The cover member 68 is cylindrically shaped having a bottom portion 68b and a cylindrical portion 68a. The cylindrical portion 63a of the first member 63 passes through the bottom 68b of the cover member 68. The projection 71c of the seal plate 71 contacts the bottom portion 68b of the cover member 68. The cylindrical portion 68a of the cover member 68 is coupled to an outer peripheral surface of the handle body 67 via screws (not shown).

An annular seal ring 72 is disposed between the bottom 68b of the cover member 68 and a rear end surface of the cylindrical portion 63a of the first member 63. An O-shaped ring 73 is coupled between a front end of the cylindrical portion 68a of the cover member 68 and the handle body 67. The seal ring 72 and the O-shaped ring 73 are both made of an elastic material such as NBR, and prevent liquid from entering inside the spool 4 through gaps between the first member 63 and the cover member 68, and between the handle body 67 of the second member 64 and the cover member 68. In prior art configurations, once liquid enters inside the spool 4 through these gaps (in the absence of sealing members), the liquid reaches the friction portion 62 through the gap between the first member 63 and the spool shaft 15, even with the seal plate 71. As a result, drag force may fluctuate due to the wet friction portion 62.

The friction portion 62 includes a first disk 101, a second disk 102, and a drag sound mechanism 103. The first disk 101 contacts the first member 63. The second disk 102 contacts the first disk 101 with a felt material therebetween. The drag sound mechanism 103 contacts the second disk 102 with a felt material therebetween. An inner peripheral portion of the first disk 101 is coupled to the spool shaft 15, so as to rotate together therewith. An outer peripheral portion of the second disk 102 is coupled to the spool 4, so as to rotate together therewith. The drag sound mechanism 103 generates a sound when the spool shaft 15 and the spool 4 rotate relative to each other, in other words, while the drag mechanism is active.

OPERATION OF THE REEL

In the above described spinning reel, the bail arm 40 is pivoted into a casting position so that the fishline can be released during casting. As a result, the fishline is let out from the front end of the spool 4 due to the weight of a lure (not shown).

When the fishline is to be wound up, the bail arm is turned back to a fishline wind-up position. The bail arm comes back to the fishline wind-up position automatically when the handle assembly 1 rotates in a direction that winds up the fishline, because of a bail reverse mechanism which is not shown in the drawings. Rotational torque of the handle assembly 1 is transmitted to the pinion gear 12, via the master gear shaft 10 and the master gear 11. Once torque is transmitted to the pinion gear 12, the torque is further transmitted to the rotor 3 from the front portion 12a of the pinion gear 12, and also to the oscillating mechanism 6 via the intermediate gear 23 which couples to the pinion gear 12. As a result, the rotor 3 rotates in the direction that winds the fishline around the spool 4 while the spool 4 moves back and forth repeatedly to evenly allow winding of the fishline.

During fishing, water spray and waves occasionally splash on a reel, and the reel becomes wet. Even when the reel becomes wet, since the drag mechanism 60 is equipped with the seal plate 71, the seal ring 72, and the O-shaped ring 73, and also since the spool 4 is equipped with the seal ring 91, water entering inside the reel from front and rear portions thereof is not likely to reach the friction portion 62. Therefore, once a drag force is adjusted, the drag force will not be changed because of the wet friction portion 62. Also, seal members such as the seal rings 18a and 18b, the shaft seal 34, the liquid gasket 80, the water repellent sealing 81, the seal ring 82, the shaft seal 85, the O-shaped ring 86, the seal plate 87 are disposed between the reel body 2a and mobile, stationary, and constituting members, liquid is prevented from entering inside the reel main body 2a. Therefore, it is unlikely that seawater enters inside the reel. Accordingly, deposits such as crystals of salt will not remain inside the bearings or guide portion. Therefore, there is no need to apply a highly viscous grease inside the reel. Also, it is less likely that deposits will be trapped between the gears and rollers, whereby the handle rotates more smoothly.

ALTERNATE EMBODIMENTS (a) Although a front-drag type spinning reel was described in the above embodiment, the present invention can be applied to water-proof structures of other types of spinning reels, including a rear-drag type spinning reel, a spinning reel without a drag, and a lever-drag type spinning reel.

(b) Although seal members were disposed on constituting members and stationary members, not only on moveable members such as a master gear, seal members can be applied to only one of the constituting, stationary, and moveable members.

EFFECT OF THE INVENTION

According to the present invention, since liquid can be prevented from entering the reel main body through gaps between moveable members, stationary members, and a reel body, grease with low viscosity can be utilized. Therefore, resistance due to viscosity of the grease decreases, thereby improving the efficiency of winding a handle. Also since liquid is prevented from entering the interior spaces of the reel main body, there are less deposits which remain after liquid evaporates, whereby deposits are less likely to be trapped between gears and rollers. In this way, rotation of the handle will be smooth.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A waterproof structure for a spinning reel having a reel main body defining an interior space, the waterproof structure for preventing liquid from entering the interior space and comprising:

a pair of coaxial ball bearings retained in opposing lateral sides of the reel main body, wherein the ball bearing outer races are stationary members fixed to the reel main body;

a master gear shaft supported near either end on said pair of ball bearings, wherein either end of said master gear shaft protrudes outward from the reel main body, and a pair of seal members supported in the reel main body respectively adjacent opposite outward sides of the ball bearings and in contact with said master gear shaft, the reel main body, and said bearings.

2. A water-proof spinning reel as set forth in claim 1, wherein
said seal members are made of an elastic material.

3. A water-proof spinning reel as set forth in claim 1, wherein:
each of said bearings is a rotary bearing having an outer race coupled to the reel main body, an inner race supporting said master gear shaft, and a roller supported between said outer race and said inner race for rolling therebetween.

4. A water-proof spinning reel as set forth in claim 3, wherein:
said seal member has an outer diameter that is slightly smaller than an outer diameter of said outer race.

5. A water-proof spinning reel as set forth in claim 4, wherein:
said master gear shaft is formed with a pair of seal contacting portions that contact respective ones of said seal members, said seal contacting portions having an outer diameter that is smaller than an inner diameter of said inner race.

6. A water-proof spinning reel as set forth in claim 5, wherein:
said master gear shaft is formed with a hollow interior having a first threaded portion and a second threaded portion, said first threaded portion being a right handed thread and said second threaded portion having a left handed thread,
the spinning reel further comprises:
a handle assembly that includes a shaft having a first threaded portion and a second threaded portion, said first threaded portion of said master gear shaft being a right handed thread and said second threaded portion of said master gear shaft having a left handed thread, and
said first threaded portion of said master gear shaft being engageable with said first threaded portion of said handle assembly, and said second threaded portion of said master gear shaft being engageable with said second threaded portion of said handle assembly.

7. A water-proof spinning reel as set forth in claim 6, wherein
one of said seal members is disposed between said outer race of said bearing and the reel main body, and
the other of said seal members is disposed between the other of said outer race and a lid member that is fixed to the reel main body.

8. A waterproof structure for a spinning reel having a reel main body defining an interior space, the waterproof structure for preventing liquid from entering the interior space and comprising:
a rotor protruding outward from the reel main body;
a reverse-rotation prevention mechanism fixedly supported on the reel main body; and
a seal member disposed about said rotor and supported between said rotor and the reel main body so as to contact both said rotor and the reel main body.

9. A water-proof spinning reel as set forth in claim 8, further comprising:
a cylindrical elastic member adapted to encircle a flange portion formed at a front side of the reel main body and an outer peripheral surface of said reverse rotation prevention mechanism.

10. A waterproof structure for preventing liquid from entering interior spaces of a spinning reel, the waterproof structure comprising:
a reel main body formed with a first flange portion having a semi-cylindrical shape;
a member adapted for connection to said reel main body and formed with a second flange portion having a semi-cylindrical shape, said first and second flange portions together defining a single cylindrical shape; and
a seal made of an elastic material and disposed between contacting surfaces of said first and second flange portions.

11. A waterproof structure for preventing liquid from entering interior spaces of a spinning reel, the waterproof structure comprising:
a reel main body formed with an opening and a first flange portion having a semi-cylindrical shape;
a member adapted for connection to said reel main body and formed with a second flange portion having a semi-cylindrical shape, said first and second flange portions together defining a single cylindrical shape; and
a seal disposed between contacting surfaces of said member and said reel main body, and said first and second flange portions; and
a lid adapted to cover said opening.

12. In a spinning reel including a main unit defining interior compartments housing reel rotary mechanisms, a configuration for waterproofing rotary mechanism shafts protruding from the compartments, the configuration comprising:
a shaft bearing stationary component fitted to one of a compartment wall and a rotary mechanism shaft penetrating the compartment wall;
a shaft bearing rotary component fitted to the other of the compartment wall and the rotary mechanism shaft penetrating the compartment wall;
a shaft seal retained by the compartment wall axially outward with respect to the compartment and contacting both said stationary and at least one of said rotary component and said rotary mechanism shaft; and
means for retaining and positioning said shaft seal against said shaft bearing stationary component.

13. A configuration as set forth in claim 12, wherein said compartment wall is rotatable with respect to said rotary mechanism shaft.

14. A configuration as set forth in claim 12, wherein said compartment wall is stationary with respect to said rotary mechanism shaft.

15. A configuration as set forth in claim 12, wherein said shaft bearing rotary component is retained in a nut screwed endwise onto a pinion gear fixed to a spinning-reel rotor front wall, and said seal is fitted into said nut on the axially frontward side of said shaft bearing rotary component.

* * * * *